No. 848,359. PATENTED MAR. 26, 1907.
A. W. FRYE & F. S. GREEN.
TRACE FASTENER.
APPLICATION FILED AUG. 2, 1906.
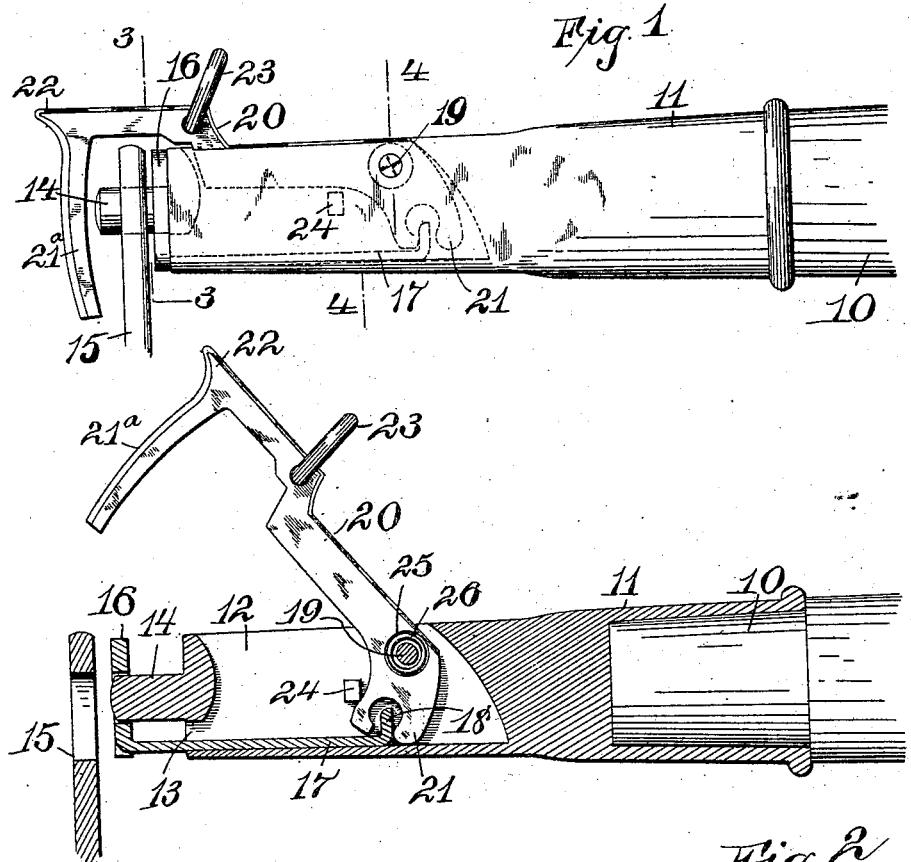
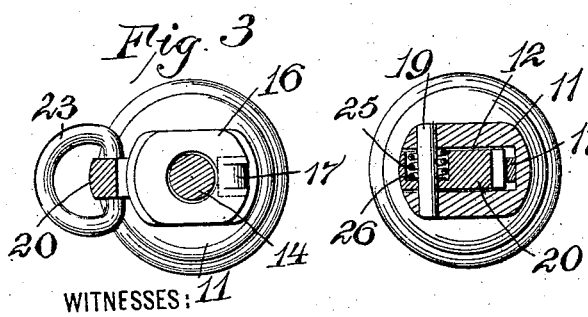
WITNESSES:
Ralph Lancaster
E. A. Pell
INVENTORS
Alburney W. Frye
and Francis S. Green
BY
Wm. H. Campfield
ATTORNEY

UNITED STATES PATENT OFFICE.

ALBURNEY W. FRYE, OF NEWARK, AND FRANCIS S. GREEN, OF IRVINGTON, NEW JERSEY.

TRACE-FASTENER.

No. 848,359.

Specification of Letters Patent.

Patented March 26, 1907.

Application filed August 2, 1906. Serial No. 328,849.

*To all whom it may concern:*

Be it known that we, ALBURNEY W. FRYE and FRANCIS S. GREEN, citizens of the United States, residing at Newark and Irvington, respectively, in the county of Essex and State of New Jersey, have invented certain new and useful Improvements in Trace-Fasteners; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to a fastening to secure the end of a trace to the end of a whiffletree and to prevent the accidental displacement of the trace.

The device also is designed to assist in securing the trace to the whiffletree and to facilitate the harnessing and unharnessing of an animal to the vehicle.

A still further object is to provide a device of this kind that provides a means for detaching the horse or animal from the vehicle in case it is thought necessary, such as a runaway.

The device is also designed to cause the detaching means to be held in any position in which it is left, so that it does not become loose and rattle, and will securely hold in a locked position.

The invention is illustrated in the accompanying drawings, in which—

Figure 1 is a top view of a whiffletree with the improved attachment. Fig. 2 is a section of the same with the device operated to detach the trace. Fig. 3 is a section on line 3 3 in Fig. 1, and Fig. 4 is a section on line 4 4 in Fig. 1.

In the drawings, 10 is the end of a whiffletree on which the casing 11 is secured in any convenient manner.

The casing is provided with a recess 12 and a perforation 13 on its end, and a stud 14 over which the trace 15 is arranged to be slid. Over the stud 14 is arranged an eye 16 with a shank 17, sliding down along one wall of the casing after passing through the perforation 13, and a right-angled portion 18 is provided on the end of the shank opposed to the eye.

Arranged to swing on a pin 19, passing through the walls of the casing 11, is a lever 20, that has the forked end 21 to fit over the right-angled portion 18 of the shank 17. Thus when the lever 20 is swung in the position shown in Fig. 1 the eye 16 is drawn back against the body portion of the casing, and it leaves the stud 14 free for the reception of the end of the trace. When the lever 20 is moved to the position in Fig. 2, the eye 16 is forced outward, and the trace is forced off of the stud 14, so that the two elements of the lever 20 and the eye 16 move in unison. The lever 20 has on its end a right-angled portion 21ª, which forms a nose, so that when the trace is on the stud 14 the nose holds it against removal, as will be seen from Fig. 1.

A finger-piece 22 is provided to operate the lever from the ground when hitching or unhitching, and a ring 23 is supplied to the back of the lever for attachment of a cord, so that the device can be operated from the vehicle in case the animal must be detached in case of accident.

To furnish a stop for the movement of the lever 20, we provide a stop 24 in the shape of a lug projecting out from one wall of the recess 12.

The lever 20 is furnished with a recess 25, as shown in Figs. 2 and 4, the end of the recess being perforated for the pin 19, and in this recess is placed a spring 26, that exerts a pressure laterally, bearing on one side on the wall of the recess 12 and on the other side on the end of the recess 25. This spring provides a friction, so that wherever the lever 20 is moved it stays, and when it is in the position shown in Fig. 1 it will not move unless operated manually.

We have provided a device that is composed of few parts and that is simple to operate and is also cheap to make.

Having thus described our invention, what we claim is—

1. A trace-detacher comprising a casing having a recess, a lever journaled in the casing and arranged in the recess, a stud on the end of the casing, an eye on the stud, and a shank on the eye projecting into the recess and engaging the end of the lever, a nose on the free end of the lever to cover the end of the stud when the eye is drawn back, a recess in the lever surrounding its pivotal pin, and a spring in the recess bearing against the casing and the lever.

2. A trace-detacher comprising a casing having a recess open on one side and having a perforation in the end, a stud on the end of the recess, a lever pivoted in the recess and having its inclosed end forked, an eye sliding on the stud, and having a shank bearing on one side of the recess, and having an end bent to engage the forked end of the lever, a nose on the lever arranged to cover the end of the stud when the eye is slid back, a finger-piece on the end of a lever for manually operating it, and a spring arranged on the lever to bear against one wall of the recess in the casing to cause a friction between the parts.

In testimony that we claim the foregoing we have hereunto set our hands this 31st day of July, 1906.

ALBURNEY W. FRYE.
FRANCIS S. GREEN.

Witnesses:
WM. H. CAMFIELD,
E. A. PELL